(12) United States Patent
Hyvärinen

(10) Patent No.: US 8,097,970 B2
(45) Date of Patent: Jan. 17, 2012

(54) METHOD AND ARRANGEMENT IN WIND POWER PLANT

(75) Inventor: Veikko Hyvärinen, Helsinki (FI)

(73) Assignee: ABB Oy, Helsinki (FI)

( * ) Notice: Subject to any disclaimer, the term of this patent is extended or adjusted under 35 U.S.C. 154(b) by 585 days.

(21) Appl. No.: 11/980,537

(22) Filed: Oct. 31, 2007

(65) Prior Publication Data

US 2008/0106100 A1    May 8, 2008

(30) Foreign Application Priority Data

Nov. 6, 2006 (FI) .................................... 20065700

(51) Int. Cl.
*F03D 9/00* (2006.01)
*H02P 9/04* (2006.01)

(52) U.S. Cl. .......................................... 290/44; 290/55

(58) Field of Classification Search ................. 290/44, 290/55

See application file for complete search history.

(56) References Cited

U.S. PATENT DOCUMENTS

| | | | | |
|---|---|---|---|---|
| 5,083,039 A * | 1/1992 | Richardson et al. | ............. | 290/44 |
| 5,406,190 A * | 4/1995 | Rosenberg | ............. | 322/32 |
| 5,844,327 A * | 12/1998 | Batson | ............. | 307/64 |
| 6,256,212 B1 | 7/2001 | Wobben | ............. | 363/40 |
| 6,680,856 B2 * | 1/2004 | Schreiber | ............. | 363/71 |
| 6,917,271 B2 * | 7/2005 | Zhang et al. | ............. | 336/160 |
| 6,946,750 B2 * | 9/2005 | Wobben | ............. | 290/44 |
| 7,015,595 B2 * | 3/2006 | Feddersen et al. | ............. | 290/44 |
| 7,042,110 B2 * | 5/2006 | Mikhail et al. | ............. | 290/44 |
| 7,102,248 B2 * | 9/2006 | Wobben | ............. | 290/44 |
| 7,180,270 B2 * | 2/2007 | Rufer et al. | ............. | 322/20 |
| 7,218,014 B2 * | 5/2007 | Steinke | ............. | 307/84 |
| 7,324,360 B2 * | 1/2008 | Ritter et al. | ............. | 363/71 |
| 7,327,588 B2 * | 2/2008 | Ollila | ............. | 363/71 |
| 7,414,331 B2 * | 8/2008 | Datta | ............. | 307/71 |
| 7,446,435 B2 * | 11/2008 | Zhang et al. | ............. | 307/105 |
| 7,471,011 B2 * | 12/2008 | Janssen | ............. | 290/55 |
| 7,773,396 B2 * | 8/2010 | Ollila et al. | ............. | 363/72 |
| 7,893,346 B2 * | 2/2011 | Nachamkin et al. | ............. | 136/244 |
| 7,928,592 B2 * | 4/2011 | Wagoner et al. | ............. | 290/44 |
| 7,939,959 B2 * | 5/2011 | Wagoner et al. | ............. | 290/55 |
| 7,944,068 B2 * | 5/2011 | Wagoner et al. | ............. | 290/44 |

(Continued)

FOREIGN PATENT DOCUMENTS

DE    42 32 356 A1    3/1994

(Continued)

OTHER PUBLICATIONS

Finland Search Report dated Jul. 13, 2007.

*Primary Examiner* — Pedro J Cuevas
(74) *Attorney, Agent, or Firm* — Buchanan Ingersoll & Rooney PC

(57) ABSTRACT

A method and an arrangement in connection with a wind power plant, an electric drive of the wind power plant comprising two or more partial converters in parallel, which constitute a frequency converter of the electric drive, and each partial converter comprising a mains converter part, of which the nominal power of at least one differs from the nominal power of other mains converter parts, and in the method there is selected for use the smallest possible, individual mains converter part required by an operating point of the wind power plant, or a combination of mains converter parts.

7 Claims, 3 Drawing Sheets

U.S. PATENT DOCUMENTS

| | | | |
|---|---|---|---|
| 2004/0022081 A1* | 2/2004 | Erickson et al. | 363/159 |
| 2004/0100102 A1* | 5/2004 | Wobben | 290/55 |
| 2004/0155603 A1* | 8/2004 | Clegg | 315/291 |
| 2005/0012339 A1* | 1/2005 | Mikhail et al. | 290/44 |
| 2005/0225908 A1* | 10/2005 | Datta | 361/38 |
| 2006/0097519 A1* | 5/2006 | Steinke | 290/44 |
| 2006/0103137 A1* | 5/2006 | Wobben | 290/44 |
| 2006/0214428 A1* | 9/2006 | Altemark et al. | 290/44 |
| 2007/0073445 A1* | 3/2007 | Llorente Gonzalez et al. | 700/286 |
| 2007/0121353 A1* | 5/2007 | Zhang et al. | 363/39 |
| 2008/0284252 A1* | 11/2008 | Jones et al. | 307/82 |
| 2009/0003020 A1* | 1/2009 | Zhang et al. | 363/65 |
| 2009/0212568 A1* | 8/2009 | Maibach et al. | 290/44 |
| 2009/0224607 A1* | 9/2009 | Kjaer et al. | 307/82 |
| 2009/0322081 A1* | 12/2009 | Wagoner et al. | 290/44 |
| 2009/0322082 A1* | 12/2009 | Wagoner et al. | 290/44 |
| 2009/0322083 A1* | 12/2009 | Wagoner et al. | 290/44 |
| 2010/0121511 A1* | 5/2010 | Onnerud et al. | 701/22 |
| 2010/0156189 A1* | 6/2010 | Fishman | 307/77 |
| 2010/0283325 A1* | 11/2010 | Marcianesi et al. | 307/82 |
| 2010/0295383 A1* | 11/2010 | Cummings | 307/151 |
| 2011/0057446 A1* | 3/2011 | Mayor Lusarreta et al. | 290/44 |
| 2011/0115301 A1* | 5/2011 | Bhavaraju et al. | 307/86 |
| 2011/0121652 A1* | 5/2011 | Sella et al. | 307/43 |
| 2011/0140535 A1* | 6/2011 | Choi et al. | 307/82 |

FOREIGN PATENT DOCUMENTS

| | | |
|---|---|---|
| DE | 102 10 164 A1 | 9/2003 |
| EP | 1 523 088 A2 | 4/2004 |
| EP | 1 416 604 A2 | 5/2004 |
| EP | 2141790 A2 * | 1/2010 |
| EP | 2141795 A1 * | 1/2010 |
| JP | 2000-341959 A | 12/2000 |
| JP | 2007-043824 A | 2/2007 |

* cited by examiner

FIG. 3

METHOD AND ARRANGEMENT IN WIND POWER PLANT

RELATED APPLICATIONS

This application claims priority under 35 U.S.C. §119 to Finnish Patent Application No. 20065700 filed in Finland on Nov. 6, 2006, the entire contents of which are hereby incorporated by reference in their entireties.

TECHNICAL FIELD

A method and an arrangement is disclosed in connection with a wind power plant, and in particular to optimization of wind power plants as regards effects on the network.

BACKGROUND INFORMATION

As the structures of wind power plants increase in size, it is often necessary to implement electric drives of the wind power plants in a modular manner. This is the case, for instance, in connection with wind power plants, in which a wind turbine is allowed to rotate at a variable speed depending on wind conditions. A generator run by the wind turbine produces electric energy that is supplied to the grid. As the speed of the wind turbine varies, the frequency of the electric energy produced by the generator also varies. Hence, at the generator output there has to be connected equipment wherewith the frequency and amplitude of the produced electricity may be arranged suitable for the electric grid. An example of this kind of equipment is a frequency converter, which receives voltage of variable frequency and amplitude and correspondingly supplies voltage at a desired frequency and amplitude to be further transferred to the grid.

The modular structure in connection with a frequency converter denotes that the frequency converter consists of a plurality of partial converters. It is more feasible to implement a high-power frequency converter by coupling a plurality of partial converters in parallel than by providing one large converter. Implementation of one converter having sufficiently high power is often technically extremely complicated, because voltage and current capacities of the required power semiconductors set limits to powers to be used.

The modular structure also enables redundancy of electric drive. The redundancy is an important feature in connection with wind power plants, in particular, as they are often located in sites where maintenance is difficult. The modular structure makes it possible that a fault in one part of the electric drive does not necessarily interrupt generation of electricity in the entire wind power plant.

Publication EP-A-1523088 discloses a modular structure in connection with electric drives, and in particular, a modular structure that enables mains converter parts being added to or removed from use depending on the circumstances. The disclosed structure makes it possible to optimize effects on the network by using standard components, i.e. such mains converters and inverters that are designed to operate with one another in all operating conditions. Typically the mains converter is designed to have a nominal power that is higher than that of an inverter part intended in connection thereof. The difference is due to the requirements set for the mains converter part as regards reactive power transmission and supply voltage variations. A disadvantage with the known solution is that power steps in the mains converter are wide, and consequently at low transmitted powers, in particular, an undesirable amount of current harmonics is transferred to the network.

SUMMARY

A method and an arrangement is disclosed implementing the method such that the above disadvantage may be alleviated.

The disclosure is based on the idea that some of the mains converter parts of a modular frequency converter may be formed of smaller components than those employed in a conventional modular structure. This structure enables frequency converter operation such that at low powers produced by the generator it is possible to select a mains converter part whose rating may be selected more accurately than previously to correspond to the transmitted power.

The modular structure of the disclosure also enables smaller dimensions of the mains converter, which is of particular importance in connection with wind power drives, as they are located in structures that are complicated to implement. In addition, the method and the arrangement of the disclosure enable improvement in efficiency of the wind power plant, because a more optimally selected mains converter produces smaller losses.

BRIEF DESCRIPTION OF THE DRAWINGS

In the following the disclosure will be described in greater detail in connection with exemplary embodiments with reference to the attached drawings, in which

FIG. 3 shows an exemplary method.

DETAILED DESCRIPTION

Figure 1:
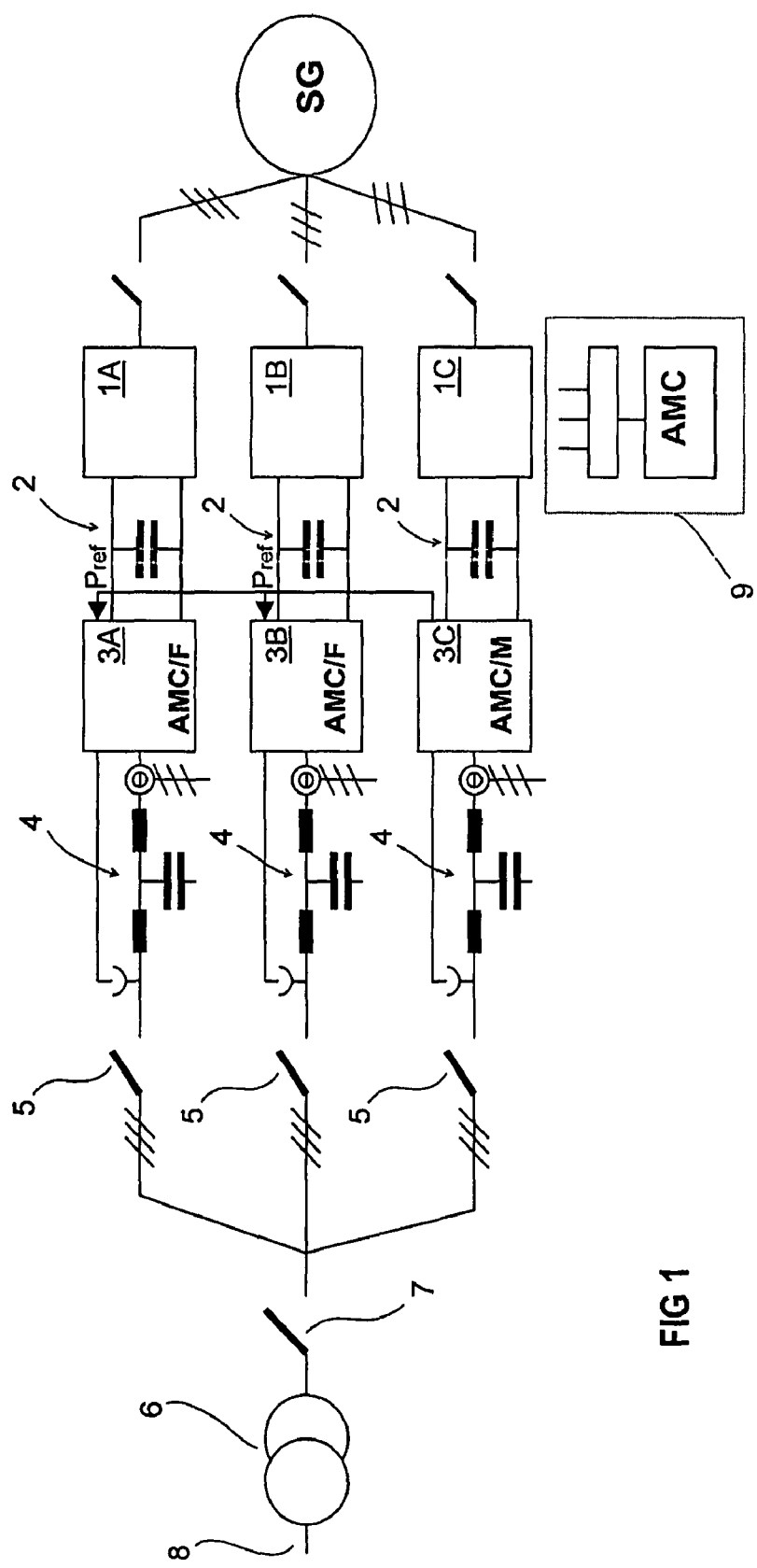
FIG. 1 shows the principle of the structure in accordance with an arrangement of the disclosure.

FIG. 1 is a graph showing the principle of an arrangement in accordance with the disclosure including three partial converters in parallel. Each partial converter comprises an inverter part 1A, 1B, 1C and a mains converter part 3A, 3B, 3C, as well as a DC voltage intermediate circuit 2 between them. Further, the electric drive of a wind power plant as shown in FIG. 1 includes a generator SG with a winding connected to each parallel partial converter, and consequently each partial converter together with the generator constitutes an independent whole. Voltage is induced in each parallel winding of the generator, the magnitudes thereof corresponding one another. Typically, these windings are formed such that they are not electrically interconnected. However, it is obvious that the operation of the inventive method does not depend on the generator type.

Each partial converter also includes a mains filter 4, which is shown in FIG. 1 as a three-phase filter of LCL type. The function of the filter is to reduce, in the known manner, effects of each partial converter on the network, i.e. harmonic currents and other possible disturbances transferred to the network.

FIG. 1 also shows measurement of currents at the output of each mains converter part and measurement of voltages at the output of the mains filters. These measurements relate to the internal operation of the mains converter part.

On the network side of the mains filters 4 there are arranged switching devices 5, wherewith each partial converter may be isolated from the grid 8 to be supplied. The partial converters are coupled together before a main switching device 7 and a supply transformer 6.

In accordance with the arrangement of the disclosure, each partial converter comprises a mains converter part 3A, 3B, 3C, of which the nominal power of at least one mains converter part differs from the nominal power of other mains converter parts. One or more of these mains converter parts are arranged for being selected for use according to an operating point in the wind power plant.

The arrangement of the disclosure is provided such that partial converters to be connected in parallel or used individually are constructed such in relation to the mains converter parts that the nominal powers of the mains converter parts are not equal. Consequently, it will be possible to select one single mains converter part or a combination of mains converter parts that is best suited for current use. In the example of FIG. 1, for instance, one of the mains converter parts is designed to have a higher or lower nominal power than the other mains converter parts. As the power generated by the wind power plant is at lowest, the partial converter including the lowest mains converter part is selected for use. In this manner it is possible to optimize the frequency converter of the electric drive as well as possible to the amount of generated effective power and reactive power.

In accordance with an exemplary embodiment of the disclosure the mains filters associated with the mains converter part are designed in accordance with the size of the mains converter part. The design of the mains filter has an influence on the effects of the wind power plant on the network. Typically the mains filter is designed such that the mains filter works optimally as the transmitted power corresponds to the design power of the mains converter part.

The mains converter parts 3A, 3B, 3C also involve control circuits AMC that are shown to be an integral part of each mains converter part. One of these control circuits (3C) is determined to have a feature, whereby it provides instructions to start itself or other mains converter parts, and partial converters relating thereto, on the basis of the power produced by the generator. The mains converter part may receive this power information from a higher control system that determines power to be produced by the generator, for instance, on the basis of wind strength. The power information is indicated in FIG. 1 as a power reference, which determines the amount of power to be transferred to each unit. The value of the power reference may be zero, which means that said drive is stopped. When not in use, a partial converter may also be disconnected completely from the supplied network by means of a switching device 5.

FIG. 1 also shows a separate control block 9, which is optional to an internal control circuit of the mains converter determined for the above purpose. This control block controls individual partial converters on the basis of a higher-level control system in the above-described manner.

In accordance with an exemplary embodiment of the disclosure the nominal powers of the inverter parts of all partial converters are equal. With this implementation all partial converters are able to process an equal power to be transferred to the network. Because the nominal power of one or more mains converter parts is lower than usual, the reactive power transferred to the supply system is to be processed with the partial converters having more capacity for this purpose.

Figure 2:
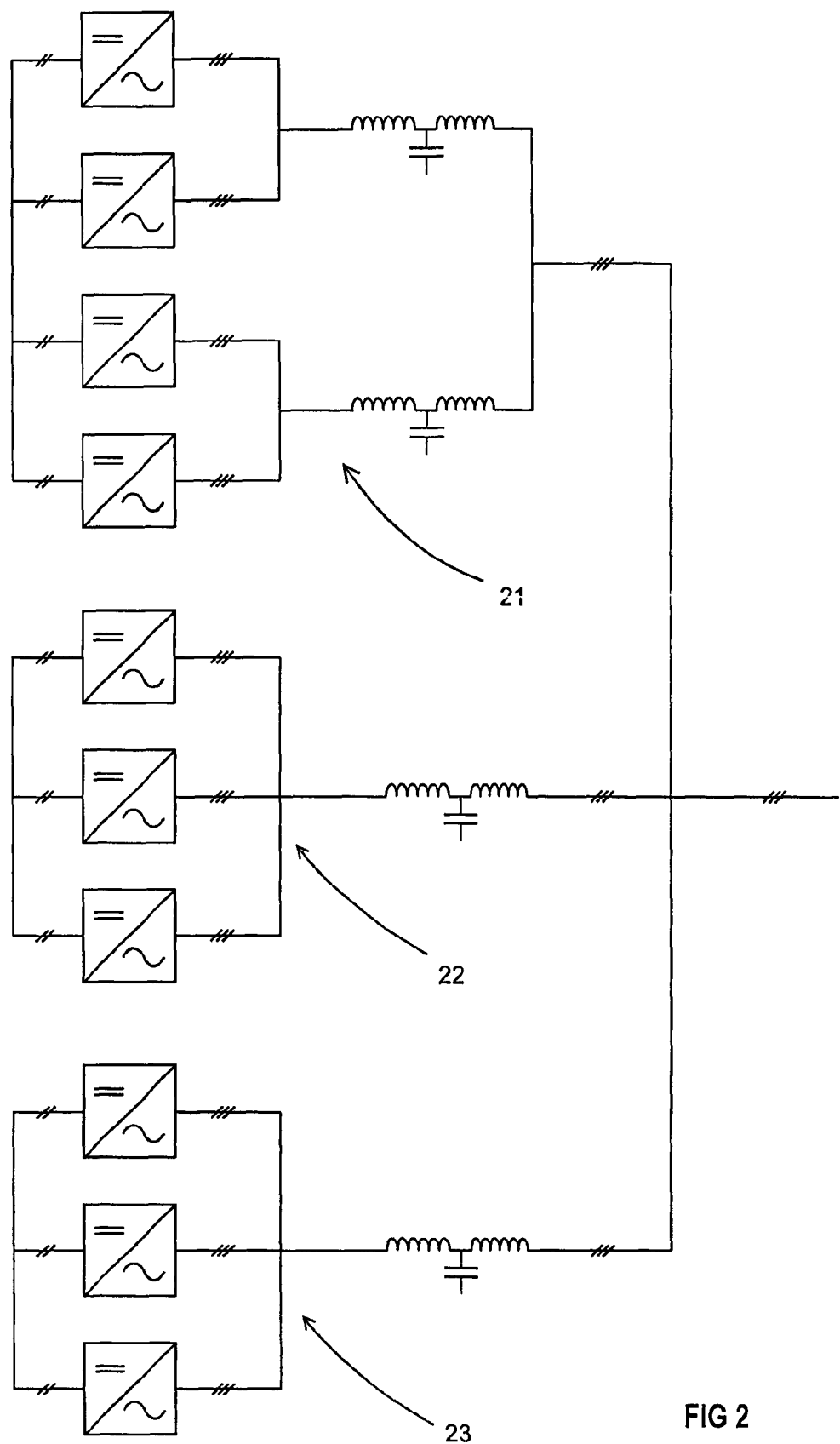
FIG. 2 shows an exemplary embodiment of mains converter parts.

FIG. 2 shows the principle how mains converter parts are configured in accordance with an exemplary embodiment of the disclosure. In this example one mains converter part 21 comprises four parallel converter bridges and two mains converter parts 22, 23 comprise three parallel converter bridges. The mains converter part 21 comprising four parallel converter bridges is capable of processing larger currents than the mains converter parts 22, 23 comprising three parallel converter bridges. This solution allows a simple implementation of the inventive idea according to which the nominal powers of the mains converters differ from one another.

In FIG. 2, the mains filter relating to the mains converter part 21 is divided into two parts such that outputs of two converter bridges are interconnected before the mains filter, and after the mains filter all outputs of the mains converter part 21 are interconnected.

In the method of the disclosure there is selected the smallest possible combination of partial converters which is in accordance with the operating point of the wind power plant and which allows transmission of the generated effective power and reactive power to the network. As wind conditions change, the number of partial converters may be reduced or increased during the operation of the apparatus without interruptions. When the method is employed, effects of the electric drive of the wind power plant on the network, i.e. harmonic current components produced, may be minimized, because unequal mains converter parts enable use of several steps in power transmission.

When a small amount of power may be transmitted to the supply system, a partial converter with the smallest mains converter part will be used. As the nominal power to be produced increases, it is possible to move over to a greater partial converter and discontinue using the smallest partial converter. As the power further increases, two partial converters with the smallest mains converter parts will be switched on. According to the disclosure this procedure may go on until all partial converters will be in use. A corresponding procedure will be applied, when the amount of power transmitted to the network is reduced.

It is apparent to a person skilled in the art that as technology advance the basic idea of the disclosure may be implemented in a variety of ways. Thus, the disclosure and the embodiments thereof are not restricted to the above-described examples, but they may vary within the scope of the claims. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An arrangement in connection with a wind power plant, an electric drive of the wind power plant comprising two or more partial converters in parallel, which constitute a frequency converter of the electric drive, wherein each partial converter includes an individual mains converter part, of which the nominal power of at least one mains converter part differs from the nominal power of other mains converter parts, wherein one or more mains converter parts are arranged for being selected for use according to an operating point of the wind power plant, and wherein each mains converter part comprises a mains filter, whose design is in accordance with each corresponding mains converter.

2. The arrangement of claim 1, wherein each partial converter includes an inverter part, the nominal powers thereof being mutually equal.

3. The arrangement of claim 1, wherein the arrangement comprises a generator including a plurality of windings in parallel.

4. The arrangement of claim 2, wherein the arrangement comprises a generator including a plurality of windings in parallel.

5. The arrangement of claim 3, wherein each mains converter part comprises a mains filter, whose design is in accordance with each corresponding mains converter.

6. A method in connection with a wind power plant, an electric drive of the wind power plant comprising two or more partial converters in parallel, which constitute a frequency converter of the electric drive, wherein each partial converter includes an individual mains converter part, of which the nominal power of at least one mains converter part differs from the nominal power of other mains converter parts, the method comprising:

determining an operating point of the wind power plants; and selecting at least one mains converter part based on the operating point of the wind power plant to optimize frequency conversion, wherein each mains converter part includes a mains filter, whose design is in accordance with each corresponding mains converter.

7. An electric drive arrangement for a wind power plant, the electric drive arrangement comprising:

a plurality of partial converters configured in parallel, to function as a frequency converter of the electric drive, each partial converter including an individual mains converter part, wherein the nominal power of at least one mains converter part differs from the nominal power of other mains converter parts for selection for use according to an operating point of the wind power plant, and wherein each mains converter part comprises a mains filter, whose design is in accordance with each corresponding mains converter.

* * * * *